United States Patent [19]
Kuntz

[11] 3,817,239
[45] June 18, 1974

[54] URINE MONITOR

[76] Inventor: David H. Kuntz, 6027 Halm St., Los Angeles, Calif. 90034

[22] Filed: May 12, 1972

[21] Appl. No.: 252,629

[52] U.S. Cl.............................. 128/2 F, 128/2 R
[51] Int. Cl............................................ A61b 10/00
[58] Field of Search............ 128/2 F, 216, 276, 214; 73/440

[56] References Cited
UNITED STATES PATENTS

| | | | |
|---|---|---|---|
| 3,175,553 | 3/1965 | Mattson.............................. | 128/2 F |
| 3,308,809 | 3/1967 | Cohen................................ | 128/2 F |
| 3,322,114 | 5/1967 | Portnoy et al...................... | 128/2 F |
| 3,405,706 | 10/1968 | Cinqualbre......................... | 128/2 F |
| 3,494,352 | 2/1970 | Russo et al......................... | 128/2 F |
| 3,604,410 | 9/1971 | Whitacre............................ | 128/2 F |
| 3,645,253 | 2/1972 | Goverde et al..................... | 128/2 F |
| 3,712,295 | 1/1973 | Kline.................................. | 128/2 F |

*Primary Examiner*—Aldrich F. Medbery
*Attorney, Agent, or Firm*—Henry M. Bissell

[57] ABSTRACT

An improved monitor for use in a catheterizing tube system has a hollow closed chamber, preferably resilient, containing test viewing means, for example, a transparent portion of the chamber, and urine testing means disposed within the chamber. The urine testing means includes a test medium which is visually responsive to a preselected urine factor to be tested. Urine transferring means, such as a needle, communicate between the chamber interior and the exterior. Catheter attaching means may be provided for releasably connecting the monitor to a urine catheter drainage system. The catheter attaching means may include a flexible shield extending forward from the front end of the chamber for releasably engaging the outer surface of one arm of the catheter Y tube. The device is constructed so as to protect the attaching element from damage and inhibit inadvertent contact therewith. The monitor is disposable and therefore permits replacement for repeated monitoring of urine as it passes through the catheter. Multiple compartments may be provided in the monitor chamber for simultaneous testing of the urine for one or a plurality of urine factors. In addition, the device may readily be used for sampling urine without in situ testing, if desired.

15 Claims, 4 Drawing Figures

PATENTED JUN 18 1974 3,817,239

URINE MONITOR

BACKGROUND OF THE INVENTION

1. Field of the Invention

The present invention generally relates to monitoring devices, particularly for monitoring factors in urine passing through a catheterizing tube system.

2. Prior Art

Laboratory testing of urine for various normal and abnormal factors is a standard diagnostic procedure in certain types of diseases. Such testing sometimes involves microscopic examination and/or culturing of the urine on suitable grown media such as agar-agar or the like to detect the presence of bacteria, fungi or the like. In addition, qualitative and/or quantitative tests can be run to determine the pH, volume, specific gravity, and the concentration of urea, ammonia, amino acid nitrogen, albumin, creatinine, uric acid, hippuric acid, lactic acid, glucose, protein, ketones, urobilinogen, phenols, porphyrins, oxalic acid, phosphoris, chlorides, alkali and alkaline earth metals, heavy metals, androgens and 17-ketosteroids, enzymes, and the like in the urine.

Laboratory testing of urine during diagnosis and treatment may involve a considerable expense, particularly where a plurality of samples and tests are required. Moreover, a considerable delay may occur between the collection of a given urine sample and the establishment of the test result, with possible consequent delay in the diagnosis or treatment. For example, when a catheter is left in place in a patient for a considerable amount of time, urinary infection may occur. Usually, laboratory tests are not performed to detect the infection until a fever results. Only when the test results are available is the proper medication usually administered. Obviously, it would be desirable to provide an in situ rapid and inexpensive urine test means which would permit identification of an infection at its earliest stage and treatment thereof before fever results. Such test means could also be useful in determining certain other urine factors at the earliest possible time with the least expense.

SUMMARY

Inexpensive, rapid, reproducable urine monitoring can be achieved by utilizing the improved monitoring device of the present invention. The device is substantially as described in the Abstract above. With one or a plurality of such devices a plurality of sequential tests can be used to sequentially monitor the urine during catheterizing to, for example, check on the results of medication being given, or to detect the first signs of any adverse change in the patient's condition, such as an infection, so that remedial steps can be immediately taken. Thus, the monitor can be contacted with a sequence of urine samples until the factor sought is detected. The monitor also can be provided with separate compartments to simultaneously monitor the urine for different factors or different levels of the same factor. The monitor can be made relatively small; can be easily attached to and detached from a catheter drainage system at any selected convenient point thereof, such as at the Y tube portion of a Foley Catheter, at the collection bag or device, or along the tubing connecting between the two; and is convenient and simple to use and to interpret relative to the results obtained therewith. Accordingly, the present monitor represents a substantial advance in the art with a saving in time and expense both to the patient and the attending physician.

Moreover, arrangements in accordance with the present invention may be used for selective sampling only of urine during catheterization, as for example to facilitate the frequent periodic sampling of diabetic patients by the simple extraction of a recent urine sample as desired for laboratory testing or other purposes.

DRAWINGS

DETAILED DESCRIPTION

First Embodiment

Figure 1:
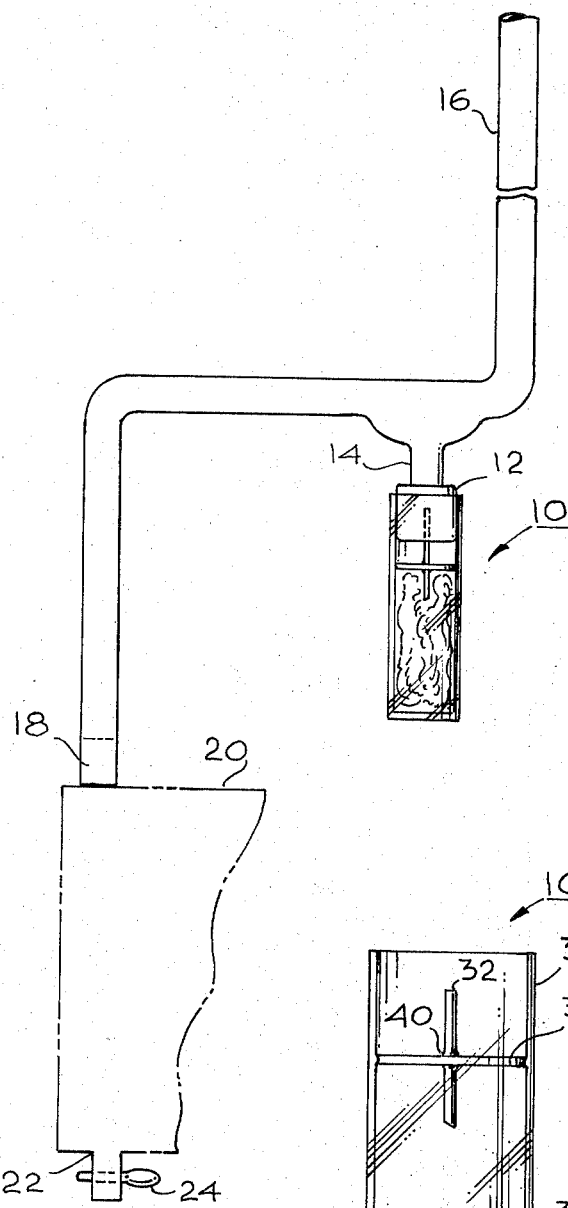
FIG. 1 is a schematic perspective view showing one particular arrangement in accordance with the invention in conjunction with a catheterizing system.

Referring more particularly to FIG. 1 of the accompanying drawings, a first preferred embodiment of the monitor of the invention is shown schematically in perspective view in a catheterizing system. Thus, a monitoring or sampling device 10 in accordance with the invention is depicted connected to a rubber cap 12 disposed along a portion 14 of a catheter tube 16. Also illustrated are the drip chamber 18 and collection bag 20 of the catheterizing system, the latter of which includes a drain spout 22 and a stop cock 24 for removal of urine from the collection bag 20. It will be understood that the system may be arranged for connection of the device 10 at other points, such as the drip chamber 18 or the Y branch of a Foley Catheter, for example.

Figure 2:
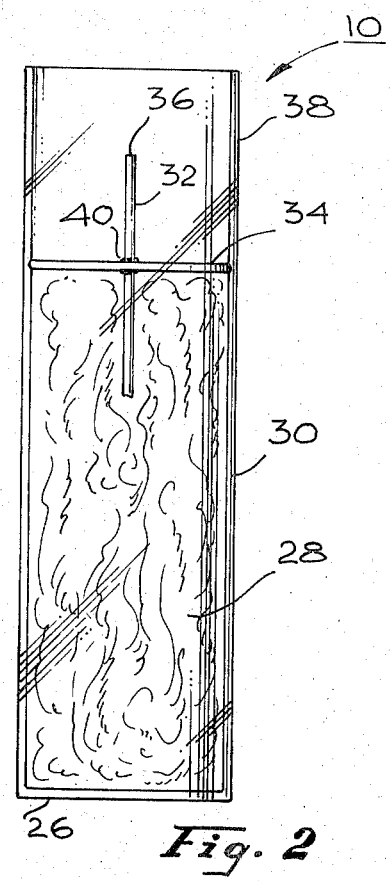
FIG. 2 is a schematic side elevation of one particular monitoring device employed in FIG. 1.

Referring more particularly to FIG. 2 of the accompanying drawings, the device 10 is there illustrated in side elevation as including a hollow, generally cylindrical closed chamber 26 within which is disposed a test medium 28, which medium may be, for example, a fluid or solid in granular form or liquid-solid mixture, gel, impregnated paper or other media, or the like.

Chamber 26 includes test viewing means, i.e., means by which any reaction taking place in the test medium 28 within the chamber can be viewed. Such means, as indicated in FIG. 2 of the accompanying drawings, comprises transparent walls of chamber 26, generally indicated by the numeral 30.

Urine transferring means are also provided in monitor 10 in the form of a hollow open ended needle 32 which extends through the front end 34 of chamber 26 and has a sharp pointed front end 36. In this regard, wall 34 is apertured so as to support needle 32 in the proper position shown in FIG. 2 so that urine can pass therethrough from the exterior of chamber 26 into the interior and in communication with the test medium 28.

Catheter attaching means may also be provided for the monitor 10 so that the monitor can easily be releasably connected to the system in order to permit sequential urine samples to be admitted to chamber 26 for testing in contact with the test medium 28. In this regard, as shown in FIG. 2, there is provided a shield 38 which is connected to the front end 34 of chamber 26 and extends forwardly therefrom. Shield 38 may be flexible and resilient so that it can be spread so as to releasably grip cap 12, as shown more particularly in FIG. 1, in order to hold the device 10 in place. The sharp end 36 of needle 32 is adapted to penetrate completely through cap 12 and to communicate with the hollow interior of segment 14 of the catheter tube 16 so as to be able to transfer urine from that position to the interior of chamber 26 in communication with medium 28, as previously described. Shield 38 facilitates maintaining this releasable connection between the device 10 and segment 14. It will be understood that any other suitable means for releasably attaching the device 10 to the system may be utilized. Thus, the device 10 may be provided with adhesive tape, a releasable clamp, or the like. Alternatively, monitor attaching means, other than by needle 32, can be eliminated if desired. The depicted configuration, however, effectively permits repeated access to the closed system through the resilient, resealing plug or membrane of the cap 12, thus providing for removal of a specimen without affecting the integrity of the sterility of the closed system.

Chamber 26 can be fabricated from any suitable material but preferably is flexible and transparent. The purpose of having chamber 26 flexible and resilient is to facilitate any transfer of urine from the interior of section 14 into communication with medium 28, as by aspiration or the like. For example, if chamber 26 is flexible, the side walls 30 thereof can be approximated and then released while needle 32 is within section 14 as illustrated in FIG. 1. This will have the effect of sucking urine into communication with test medium 28. If medium 28 is solid, the urine sample, after testing, can be forced from chamber 26 without removing medium 28, so that such medium can be reused for additional testing.

It is also preferred to have chamber 26 transparent in order to facilitate test viewing of the results obtained on reaction of the urine with medium 28. For this purpose, flexible, self supporting yet resilient plastic material, such as polyethylene, polyvinyl chloride or the like can be used satisfactorily for chamber 26. Alternatively, translucent rubber can be used. In such an event, it is desirable to have means which can more adequately support needle 32 in place in the front end 34 of chamber 26 and for this purpose a hollow rubber gasket 40 may be inserted in a suitably sized aperture (not shown) in end 34 to resiliently support needle 32 in place, as shown in FIG. 2.

Needle 32 can be fabricated from any suitable material, for example, hollow chrome steel tubing or the like which is sufficiently rigid and capable of bearing a sufficiently sharp pointed front end 36 so as to render complete penetration of cap 12 easy.

Shield 38 can be fabricated of rigid or resilient, flexible expandable plastic or rubber or the like. Alternatively, resilient plastic or the like with expension means in the form of slots or the like (not shown) can be used for releasably attaching chamber 26 to catheter tube 16. Shield 38 has the additional advantage of providing physical protection for needle 32, particularly its sharp end 36 before and after actual use.

The device 10 can be used by pushing chamber 26 towards cap 12 until needle 32 and particularly point 36 penetrates entirely through cap 12 in communication with the interior of section 14. The flexible side walls 30 of chamber 26 can then be approximated between the thumb and forefinger or middle finger of one hand and then released to aspirate or suck the urine from section 14 into the hollow interior of chamber 26. To hold the device 10 in place, shield 38 can be applied around the exterior surface of cap 12 as shown in FIG. 1 to grip the same.

Second Embodiment

Figure 3:
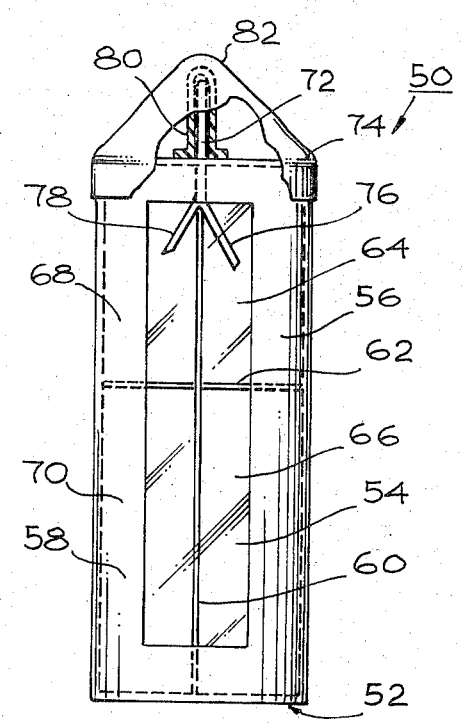
FIG. 3 is a schematic side elevation illustrating a second embodiment of the monitor of the invention, with portions broken away to illustrate certain internal components thereof.

A second preferred embodiment of the device of the invention is illustrated schematically in side elevation in FIG. 3, with portions broken away to show the internal construction thereof. In this regard, in FIG. 3, a monitor 50 is illustrated which includes a hollow generally cylindrical chamber 52 having a transparent window 54 therein. Chamber 52 is sub-divided longitudinally into 2 or more compartments such as 56 and 58 by a fluid impermeable partition wall 60. Optionally a transverse wall 62 in chamber 52 divides each compartment 56 and 58 into two subcompartments, identified as sub-compartments 64 and 66 of compartment 56 and sub-compartments 68 and 70 of compartment 58. Wall 62 preferably is a fluid permeable barrier which merely restrains mixing together of solids separately disposed in the respective sub-compartments.

Urine access to each of compartments 56 and 58 is provided by a needle 72 which extends forwardly through the front wall 74 of chamber 52 at the center line thereof and bifurcates rearwardly into two arms 76 and 78 communicating with the interior of chamber 52, one arm per compartment. The front end of needle 72 (not shown) is sharp and needle 72 is covered with a removable flexible cover 80 or the like to protect the same from damage. Moreover, cover 80 is, in turn, protected by an outer jacket 82 extending over the front end 74 of chamber 52 and which may be fabricated of tissue paper or the like easily removable from end 74.

Chamber 52 is fabricated of self-supporting preferably resilient material which, as previously indicated, need not be transparent apart from the window portion 54 thereof. For example, chamber 52 may be fabricated from hard or flexible rubber or plastic which includes a clear plastic flexible window area 54. Cap 80 may also be fabricated of resilient rubber or plastic, and needle 72 is preferably fabricated of self-supporting hollow tubular steel or the like. Suitable media are provided within the compartments and sub-compartment of chamber 52 for visual response to preselected factors in urine contacting the same.

With monitor 50 it is possible simultaneously to carry out, for example, a plurality of urine tests requiring different test media, for example to test simultaneously for the presence of glucose and of acetone. Also, it is possible to carry out the same test but utilizing different concentrations of visual responsive test media in the separate compartments so as to readily pinpoint, for example, a pH range, or a concentration range for sugar, albumin or the like. Urine passing sequentially through the forward sub-compartment and then the rear sub-compartment of each compartment can be acted on sequentially by separate reagents or different concentrations of the same reagents to accomplish desired test results.

The urine monitor of the invention can be used to detect various urinary infections and urine abnormalities as well as for the quantitative or qualitative determination of other urine factors. Thus, for example, the test medium of the monitor may include tetrazolium chloride (2,3,5-triphenyltetragolium chloride) commercially available from Eli Lilly Company and having the chemical formula $CN_4Cl(C_6H_5)_3$. This test medium converts to the red insoluble dye triphenyl formazon $(CN_4H(C_6H_5)_3)$ upon reaction with bacteria commonly encountered in certain urinary infections. Accordingly, a red color in the test medium is a sign of the presence of bacteria in the urine. For test purposes, the tetrazolium chloride may be disposed on an inert base material such as alumina particles or the like or in aqueous solution within the chamber of the monitor.

As another example, the monitor chamber can be provided with one or a plurality of strips of commercially available indicator test paper of desired pH range for the in situ determination of the urine pH. Strips of test paper for detection of, for example, about pH 5.0–6.0, about pH 6.0–7.0, about pH 4.0–5.0 and about pH 7.0–8.0 can be simultaneously contacted in the monitor chamber with urine so as to clearly delineate the urine pH for each sample tested.

In other instances, ion exchange resins and other specially treated media can be used as filtering means in the forward portions of the monitor chamber so as to prepare the urine before reaction with the test medium in the rear portion of the chamber.

Other suitable adaptations of standard laboratory urine tests easily can be made if the test results are visually determinable and providing the tests do not require special processing techniques such as heating, centrifugation, elution or the like.

Figure 4:
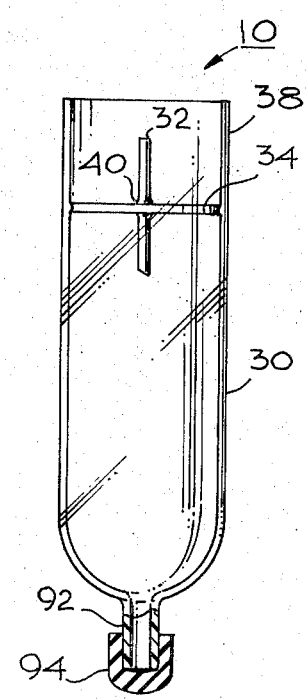
FIG. 4 is a view similar to FIG. 2 showing a device as utilized for sampling.

Other tests may be adapted for use with apparatus of the present invention for sampling and testing as already described. The apparatus may be employed for extracting samples which are to be utilized in tests to be conducted apart from the apparatus if desired. The device of FIG. 4 may be used in this regard and may be arranged for taking a specimen without in situ testing. The device 10 of FIG. 4 is like that of FIG. 2, and corresponding parts bear like reference numerals except as indicated. The FIG. 4 device is without the inner testing material 28 and is provided with an exit tube 92 and cap 94 to facilitate transfer of the specimen from the device 10, once it has been acquired from the catheterizing system of FIG. 1. With the cap 94 removed, the exit tube 92 may be coupled to other tubing, if desired. Cap 94 serves to seal the lower end of the sampling device 10 when in place as shown.

Accordingly, an improved urine monitoring and sampling device is provided which is simple, inexpensive, easy and rapid to use, which can be made disposable, and which is capable of accurately visually providing selected urine test results. All improvements, and modifications which are within the scope of the appended claims form part of the present invention.

What is claimed is:

1. An improved urine specimen collection device for use with a urinary catheter drainage system, which device comprises,
a receptacle, said receptacle including one portion comprising a a hollow closed chamber including means for aspirating;
urine from said system and a wall means at one end providing a fluid tight seal and a hollow penetrating means extending through said wall, at least the outer end thereof being pointed, said receptacle having a second portion extending from said first portion beyond the outer end of said penetrating means and spaced therefrom, said portion defining a means for releasably and hermetically connecting the hollow penetrating means and the receptacle means to a selected portion of said system.

2. The device of claim 1 wherein said hollow penetrating means includes a hollow needle centrally disposed through and extending forward from the front end of said chamber and communicating between the exterior and hollow interior of said chamber.

3. The device of claim 1 further including urine testing material disposed within said chamber.

4. The device of claim 3 wherein the chamber includes test viewing means.

5. The device of claim 4 wherein said test viewing means includes a transparent portion of said chamber.

6. The device of claim 3 wherein said urine testing material includes a test medium visually responsive to a preselected urine factor.

7. The device of claim 1 wherein said device is disposable and said releasable connecting means includes a shield extending forward from the front end of said chamber for releasably engaging the outer surface of a hollow cylindrical extension of a portion of said system.

8. The device of claim 7 wherein said hollow penetrating means includes a hollow needle disposed through and extending forward from the front end of said chamber and having a sharp outer point positioned for penetrating a resilient plug of a portion of said system.

9. The device of claim 8 wherein said chamber is generally cylindrical and comprises transparent plastic and wherein said shield comprises rubber.

10. The device of claim 9 wherein said chamber includes a plurality of non-communicating compartments, wherein at least one of said compartments is sub-divided into a plurality of sub-compartments by a fluid permeable barrier and wherein said chamber includes means for transferring urine to each of said compartments.

11. The device of claim 10 wherein said device is generally cylindrical and includes at least one of a removable cap covering said needle.

12. The device of claim 1 wherein the shield member is generally cylindrical in shape and is positioned generally coaxially with the hollow needle.

13. The device of claim 17 wherein the shield member is sized to slidably engage the outer surface of a hollow cylindrical extension of a portion of said system while guiding the point of the hollow needle to penetrate a predetermined section of said surface.

14. The device of claim 2 wherein said one portion further includes an exit tube separate from the hollow needle and communicating between the exterior and hollow interior of said chamber, the exit tube being disposed to transfer to a further collection device urine transferred to said hollow chamber by means of said hollow needle.

15. The device of claim 14 further including a removable cap member affixed to selectively close said exit tube.

* * * * *

UNITED STATES PATENT OFFICE
CERTIFICATE OF CORRECTION

Patent No. 3,817,239            Dated June 18, 1974

Inventor(s)       DAVID H. KUNTZ

It is certified that error appears in the above-identified patent and that said Letters Patent are hereby corrected as shown below:

Column 5, line 58, after "comprises" the comma should be a colon; lines 61-65 should read: --means for aspirating urine from said system and a wall means at one end providing a fluid tight seal with a hollow penetrating means extending through the wall means, at least the outer end of the penetrating means being pointed; said receptacle--. Column 6, line 1, "first" should read --one--; line 3, after "said" insert --second--; line 4, delete "a"; line 5, delete "the" (second occurrence); line 6, delete "means"; line 45, delete "at least one of"; line 50, "17" should read --12--.

Signed and Sealed this nineteenth Day of August 1975

[SEAL]

Attest:

RUTH C. MASON
*Attesting Officer*

C. MARSHALL DANN
*Commissioner of Patents and Trademarks*